(12) United States Patent
Booth et al.

(10) Patent No.: US 6,425,242 B2
(45) Date of Patent: Jul. 30, 2002

(54) DIAGNOSTIC SYSTEM FOR MONITORING CATALYST OPERATION USING ARC LENGTH RATIO

(75) Inventors: Richard Andrew Booth, Canton; Brent Edward Sealy, Dearborn; Kenneth John Behr, Farmington Hills; Michael John Cullen, Northville, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/895,681

(22) Filed: Jul. 2, 2001

Related U.S. Application Data

(63) Continuation of application No. 09/488,419, filed on Jan. 20, 2000.

(51) Int. Cl.$^7$ ................................................. F01N 3/00
(52) U.S. Cl. .............................. 60/277; 60/274; 60/276
(58) Field of Search .......................... 60/274, 276, 277, 60/285; 123/688, 690

(56) References Cited

U.S. PATENT DOCUMENTS

| | | | |
|---|---|---|---|
| 5,074,113 A | 12/1991 | Matsuoka | |
| 5,207,057 A | 5/1993 | Kayanuma | |
| 5,228,287 A | 7/1993 | Kuronishi et al. | |
| 5,233,829 A | 8/1993 | Komatsu | |
| 5,247,793 A | 9/1993 | Yamada et al. | |
| 5,255,512 A | 10/1993 | Hamburg et al. | |
| 5,279,114 A | 1/1994 | Kurita et al. | |
| 5,282,360 A | 2/1994 | Hamburg et al. | |
| 5,351,484 A * | 10/1994 | Wade | 60/274 |
| 5,359,852 A | 11/1994 | Curran et al. | |
| 5,377,484 A | 1/1995 | Shimizu | |
| 5,394,691 A | 3/1995 | Seki | |
| 5,417,058 A | 5/1995 | Shimizu | |
| 5,450,837 A | 9/1995 | Uchikawa | |
| 5,485,382 A | 1/1996 | Seki et al. | |
| 5,511,377 A | 4/1996 | Kotwicki | |
| 5,570,574 A | 11/1996 | Yamashita et al. | |
| 5,704,339 A | 1/1998 | Choe et al. | |
| 5,706,793 A | 1/1998 | Orzel et al. | |
| 5,749,221 A | 5/1998 | Kawahira et al. | |
| 5,875,628 A | 3/1999 | Mitsutani | |
| 5,894,727 A | 4/1999 | Zimlich | |
| 5,899,062 A | 5/1999 | Jerger et al. | |
| 5,948,974 A | 9/1999 | Mitsutani | |
| 6,047,542 A * | 4/2000 | Kinugasa et al. | 60/274 |
| 6,122,910 A | 9/2000 | Hoshi et al. | |
| 6,301,880 B1 * | 10/2001 | Cullen et al. | 60/274 |

* cited by examiner

Primary Examiner—Thomas Denion
Assistant Examiner—Binh Tran
(74) Attorney, Agent, or Firm—John F. Buckert; Allan J. Lippa

(57) ABSTRACT

A method and system for diagnosing catalyst operation in an internal combustion engine having a two-bank, three EGO sensor structure includes determining the ratio of the arc length between the post-catalyst EGO sensor signal and the arc length of a pre-catalyst EGO sensor signal over a selected time period. If the exhaust bank is a one-sensor bank having only a post-catalyst EGO sensor and no pre-catalyst EGO sensor, the system uses the arc length from the pre-catalyst EGO sensor in the two-sensor bank to calculate the arc length ratio, thereby allowing calculation of two arc length ratios without two matched pairs of EGO sensors. The ratio indicates the efficiency of the catalyst and may be compared with calibratable or experimentally-determined thresholds to monitor converter efficiency over time.

17 Claims, 3 Drawing Sheets

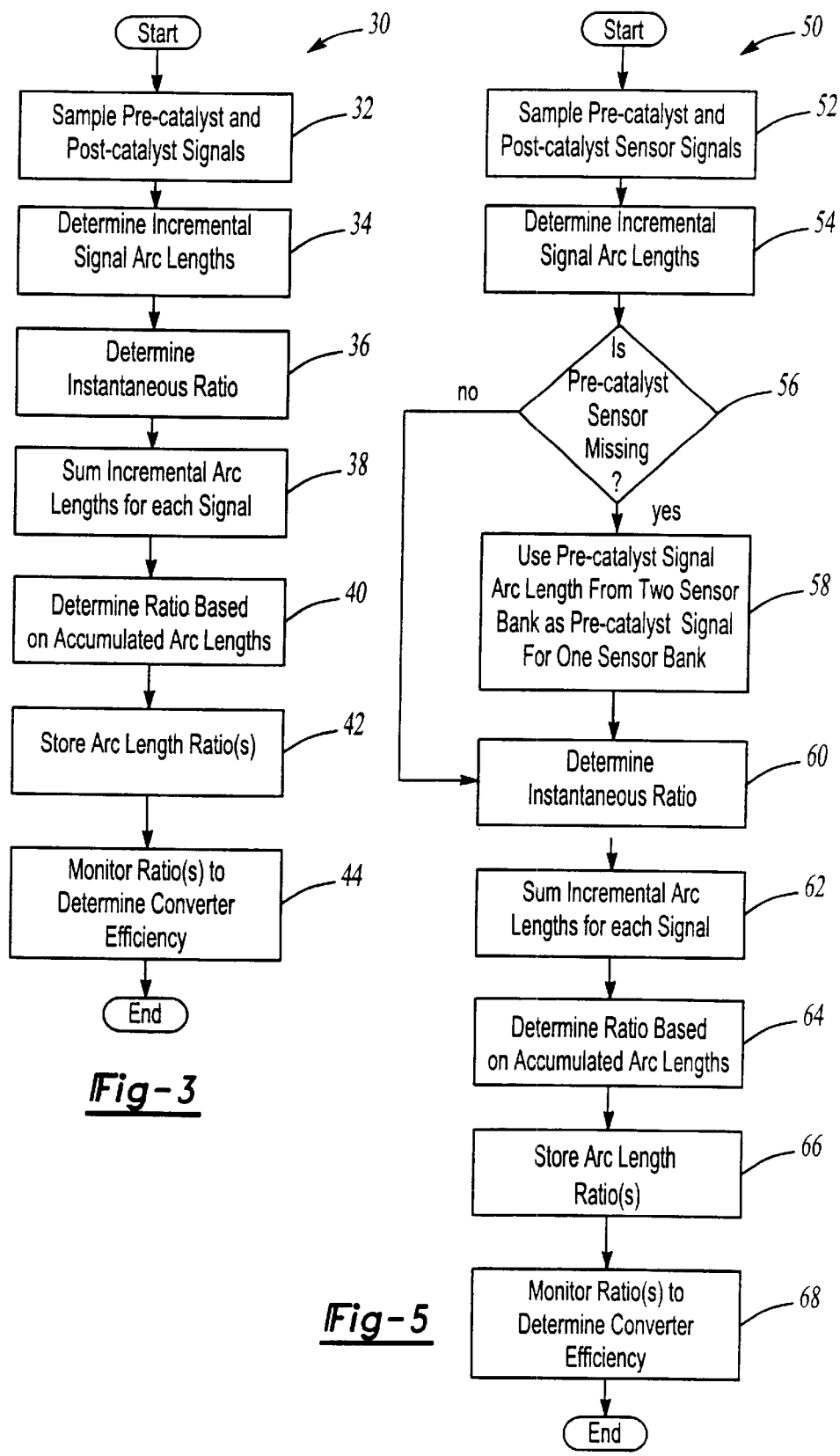

DIAGNOSTIC SYSTEM FOR MONITORING CATALYST OPERATION USING ARC LENGTH RATIO

This application is a continuation of Ser. No. 09/488,419 filed Jan. 20, 2000.

TECHNICAL FIELD

The present invention is directed to a system for monitoring catalyst operation in an internal combustion engine having a two-bank exhaust system. More particularly, the invention is directed to a diagnostic system that monitors catalyst efficiency by comparing signals between a pre-catalyst EGO sensor and a post-catalyst EGO sensor in two different banks.

BACKGROUND ART

To meet current emission regulations, automotive vehicles must regulate the air/fuel ratio (A/F) supplied to the vehicles' cylinders so as to achieve maximum efficiency of the vehicles' catalysts. For this purpose, it is known to control the air/fuel ratio of internal combustion engines using an exhaust gas oxygen (EGO) sensor positioned in the exhaust stream from the engine. The EGO sensor provides feedback data to an electronic controller that calculates preferred A/F values over time to achieve optimum efficiency of a catalyst in the exhaust system. More particularly, the EGO sensor feedback signals are used to calculate desired A/F ratios via a jumpback and ramp process, which is known in the art.

It is also known to have systems with two EGO sensors in a single exhaust stream in an effort to achieve more precise A/F control with respect to the catalyst window. Normally, a pre-catalyst EGO sensor is positioned upstream of the catalyst and a post-catalyst EGO sensor is positioned downstream of the catalyst. Finally, in connection with engines having two groups of cylinders, it is known to have a two-bank exhaust system coupled thereto where each exhaust bank has its own catalyst as well as its own pre-catalyst and post-catalyst EGO sensors.

It is known in the art to monitor the efficiency of a catalyst by determining the arc length ratio between signals generated by corresponding pre-catalyst and post-catalyst EGO sensors in the same exhaust stream and connected to the same catalyst. This type of system is described in U.S. Pat. No. 5,899,062 to Jerger et al. and entitled "Catalyst Monitor Using Arc Length Ratio of Pre- and Post-Catalyst Signals", the disclosure of which is incorporated herein by reference.

Sometimes, in a two-bank, four-EGO sensor exhaust system, one of the pre-catalyst EGO sensors degrades. In other circumstances, it is desirable to purposely eliminate one of the pre-catalyst EGO sensors in a two-bank system to reduce the cost of the system. In either event, it is desirable to be able to monitor the catalyst efficiency in the group of cylinders coupled to the exhaust bank having only one operational EGO sensor by using the signals received from the three operational EGO sensors alone. However, known methods for catalyst diagnosis require a matched set of pre-catalyst and post-catalyst EGO sensors in each bank, such as in a one-bank, two EGO sensor system or in a two-bank, four EGO sensor system, so that the arc lengths between the corresponding pre-catalyst and post-catalyst sensors can be compared. Thus, for a two-bank, three EGO sensor system, only the catalyst in the two EGO sensor exhaust bank will be monitored and diagnosed, while the catalyst in the bank having only one operational EGO sensor will remain unmonitored.

There is a need for an improved system that can monitor the operation of a catalyst in a one-sensor bank even though the catalyst only has one EGO sensor coupled to it.

SUMMARY OF THE INVENTION

Accordingly, the present invention is directed toward a new system and method for monitoring the operation of both catalysts in an internal combustion engine having a group of cylinders coupled to two functioning EGO sensors (the "two-sensor bank") and another group of cylinders coupled to one functioning EGO sensor (the "one-sensor bank"). More particularly, the operation of the catalyst in the one-sensor bank is monitored and diagnosed based on a signal from a post-catalyst EGO sensor connected to the catalyst and a signal from a pre-catalyst EGO sensor in a different bank and connected to a different catalyst.

In a preferred embodiment of the invention, for a system that is a missing a pre-catalyst EGO sensor in the one-sensor bank, the signal from the pre-catalyst EGO sensor in the two-sensor bank is used to calculate a diagnostic signal for the catalyst in the one-sensor bank. In essence, the invention assumes that a signal characteristic for the non-existent pre-catalyst EGO sensor in the one-sensor bank would be the same as the signal characteristic of the existing pre-catalyst EGO sensor in the two-sensor bank and calculates a diagnostic signal for the catalyst in the one-sensor bank accordingly. The diagnostic signal can be, for example, a ratio of the arc lengths between the post-catalyst and pre-catalyst EGO sensor signals.

Once the arc length ratios are calculated, the ratios can be compared with calibratable or experimentally-generated ratios to monitor the catalyst efficiency over time. As a result, the invention can monitor and diagnose the operation of the catalysts in both the one-sensor bank and the two-sensor bank even though the one-sensor bank does not have a matched pair of EGO sensors.

BRIEF DESCRIPTION OF THE DRAWINGS

FIG. 3 is a flowchart illustrating a known method in which the arc length ratio is calculated for a two-sensor bank.

FIG. 5 is a flowchart illustrating the inventive method in which the arc length ratio is calculated.

DETAILED DESCRIPTION OF THE PREFERRED EMBODIMENT

Figure 1:
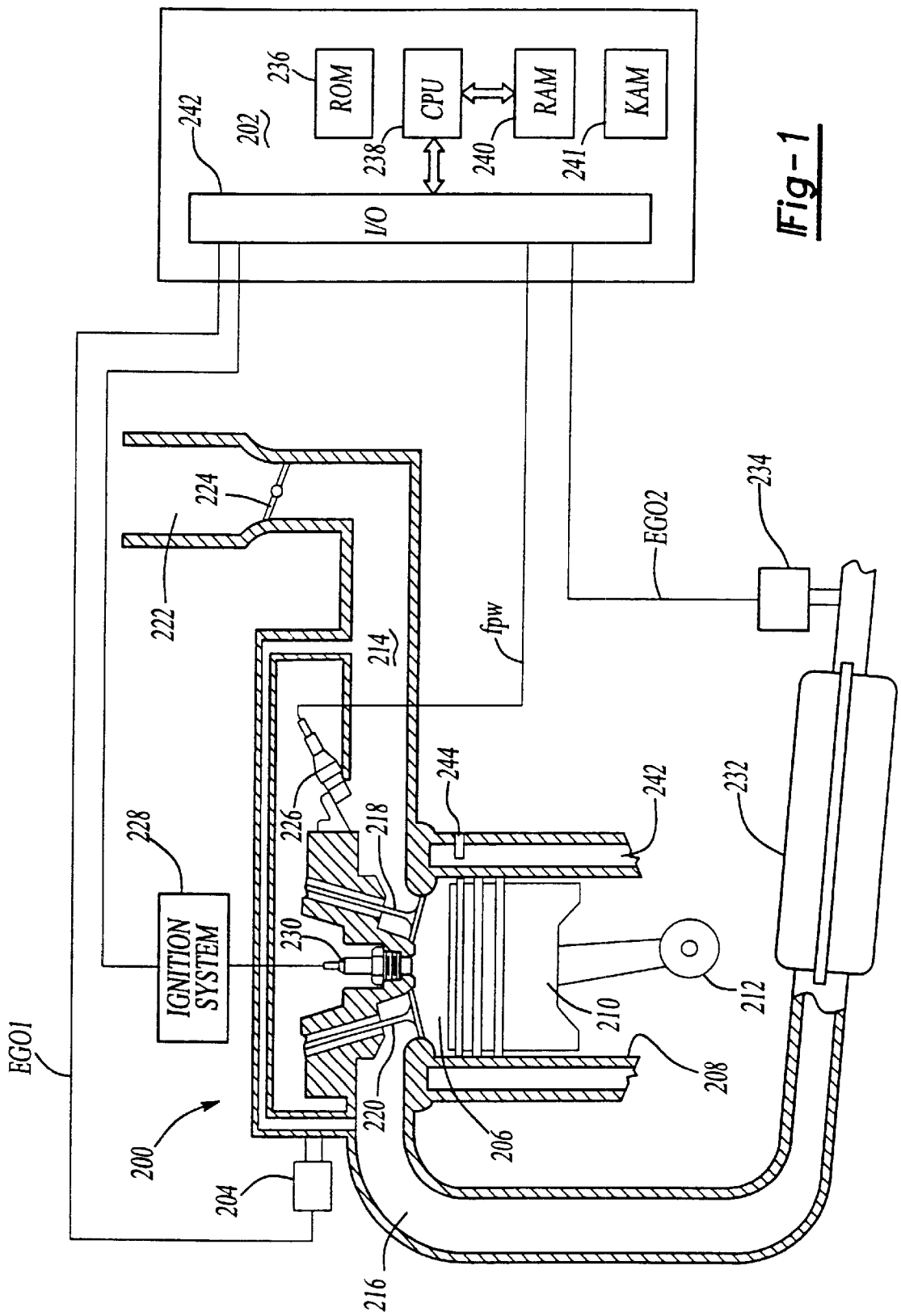
FIG. 1 illustrates an internal combustion engine according to a preferred embodiment of the invention.

FIG. 1 illustrates an internal combustion engine. Engine 200 generally comprises a plurality of cylinders, but, for illustration purposes, only one cylinder is shown in FIG. 1. Engine 200 includes combustion chamber 206 and cylinder walls 208 with piston 210 positioned therein and connected to crankshaft 212. Combustion chamber 206 is shown communicating with intake manifold 214 and exhaust manifold 216 via respective intake valve 218 and exhaust valve 220. As described later herein, engine 200 may include multiple exhaust manifolds with each exhaust manifold corresponding to a group of engine cylinders. Intake manifold 214 is also shown having fuel injector 226 coupled thereto for delivering liquid fuel in proportion to the pulse width of signal FPW from controller 202. Fuel is delivered to fuel injector 226 by a conventional fuel system (not shown) including a fuel tank, fuel pump, and fuel rail (not shown).

Conventional distributorless ignition system 228 provides ignition spark to combustion chamber 206 via spark plug 230 in response to controller 202. A first two-state EGO sensor 204 is shown coupled to exhaust manifold 216 upstream of catalyst 232. A second two-state EGO sensor 234 is shown coupled to exhaust manifold 216 downstream of catalyst 232. The upstream EGO sensor 204 provides a feedback signal EGO1 to controller 202 which converts signal EGO1 into two-state signal EGOS1. A high voltage state of signal EGOS1 indicates exhaust gases are rich of a reference A/F and a low voltage state of converted signal EGO1 indicates exhaust gases are lean of the reference A/F. The downstream EGO sensor 234 provides signal EGO2 to controller 202 which converts signal EGO2 into two-state signal EGOS2. A high voltage state of signal EGOS2 indicates that the engine is running rich, and a low voltage state of converted signal EGO1 indicates that the engine is running lean. Controller 202 is shown in FIG. 1 as a conventional microcomputer including: microprocessor unit 238, input/output ports 242, read only memory 236, random access memory 240, keep alive memory 241 and a conventional data bus.

Figure 2:
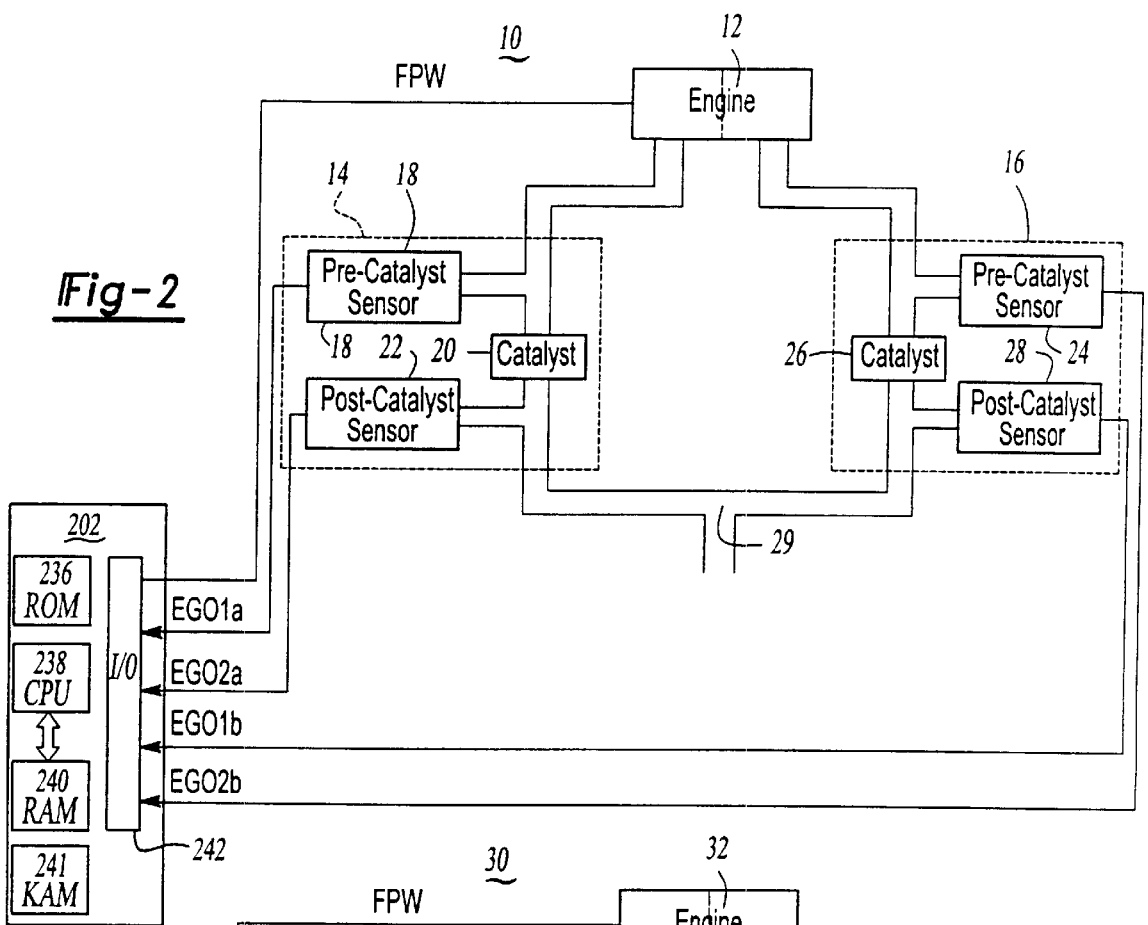
FIG. 2 is a block diagram representing a known two-bank exhaust system with each bank having pre-catalyst and post-catalyst EGO sensors.
Figure 4:
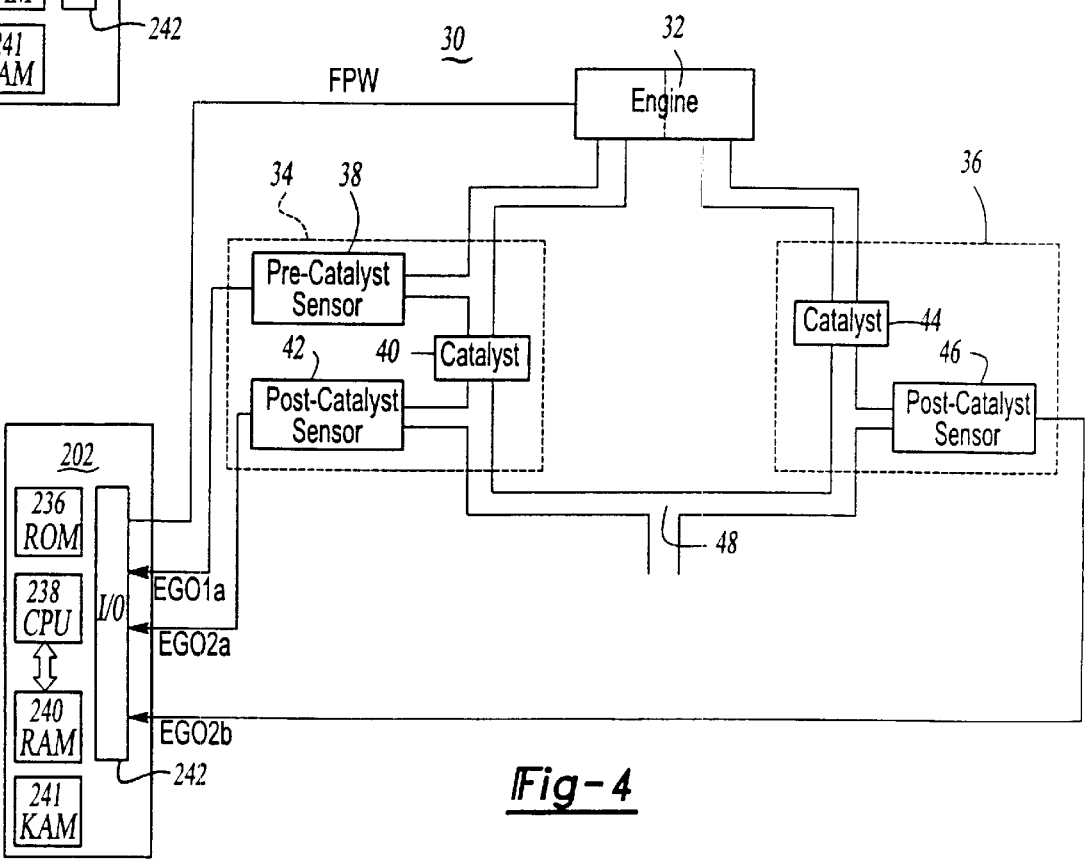
FIG. 4 is a block diagram representing a two-bank exhaust system wherein one bank has a pre-catalyst and a post-catalyst EGO sensor and the other bank has only a post-catalyst EGO sensor.

FIGS. 2 and 4 schematically illustrate different embodiments of a two-bank exhaust system to be used in the present invention. FIG. 2 shows a known two-bank, four EGO-sensor exhaust system. As illustrated in FIG. 2, exhaust gases flow from first and second groups of cylinders of engine 12 through a corresponding first exhaust bank 14 and second exhaust bank 16. Engine 12 is the same as or similar to engine 200 in FIG. 1. Exhaust bank 14 includes pre-catalyst EGO sensor 18, catalyst 20, and post-catalyst EGO sensor 22. Exhaust bank 16 includes pre-catalyst EGO sensor 24, catalyst 26 and post-catalyst EGO sensor 28. The pre-catalyst EGO sensors, catalysts, and post-catalyst EGO sensors in FIG. 2 are the same as or similar to pre-catalyst EGO sensor 204, catalyst 232, and post-catalyst EGO sensor 234 in FIG. 1.

In operation, when exhaust gases flow from engine 12 through exhaust bank 14, pre-catalyst EGO sensor 18 senses the emissions level in the exhaust gases passing through bank 14 before they enter catalyst 20 and provides feedback signal EGO1a to controller 202. After the exhaust gases pass through catalyst 20, post-catalyst EGO sensor 22 senses the emissions level in the exhaust gases after they exit the catalyst 20 and provides feedback signal EGO1b to controller 202. With respect to exhaust bank 16, pre-catalyst EGO sensor 24 senses the emissions level in the exhaust gases passing through bank 16 before they enter catalyst 26 and provides feedback signal EGO2a to controller 202. After the exhaust gases pass through catalyst 26, post-catalyst EGO sensor 28 senses the emissions level in the exhaust gases after they exit catalyst 26 and provides feedback signal EGO2b to controller 202. Then the exhaust gases are joined at junction 29 before being expelled from the system 10, though the disclosed invention is equally applicable to a system wherein the exhaust banks are kept separate throughout the entire system. Controller 202 uses feedback signals EGO1a, EGO1b, EGO2a, and EGO2b, which reflect the current operating conditions of the catalysts 20, 26, to calculate the arc length ratios for diagnosing catalyst operation. The controller shown in FIG. 2 is the same as or similar to controller 202 shown in FIG. 1.

Catalyst operation can be monitored by comparing selected signal characteristics, such as the arc length, of the signals from the pre-catalyst and post-catalyst EGO sensors connected to that catalyst. Although the present application focuses on calculating a catalyst diagnostic signal based on the arc lengths of the EGO sensor signals, any signal characteristic can be used as long as one signal is from a pre-catalyst EGO sensor and the other signal is from a post-catalyst EGO sensor, even if the sensors are in different exhaust banks. One way in which the arc length ratios are calculated for a two-sensor bank is explained in U.S. Pat. No. 5,899,062, which is incorporated herein by reference. A flowchart of the known calculation process is shown in FIG. 3. Because each catalyst 20, 26 is coupled to both a pre-catalyst EGO sensor 18, 22 and a post-catalyst EGO sensor 24, 28 in each bank 14, 16, the same process is used to calculate the arc length ratios for monitoring each catalyst 20, 26. In this case, the system samples both the pre-catalyst EGO sensor signals and post-catalyst EGO sensor signals 32 and then determines incremental signal arc lengths 34 from the samples. An instantaneous ratio is calculated 36 from the incremental arc lengths, preferably by dividing the incremental arc length of the post-catalyst signal by the incremental arc length of the pre-catalyst signal for a given catalyst. The system then sums the incremental arc lengths of each signal 38 from the EGO sensors to obtain an estimate of the line integral for a particular signal segment and calculates an accumulated arc length ratio based on the summed arc lengths 40. The instantaneous and accumulated arc length ratios are then stored in memory 42 and used to monitor the efficiency of the catalyst 44. For example, the arc length of the post-catalyst signal with respect to the arc length of the pre-catalyst signal will increase as the catalyst ages and becomes less efficient.

FIG. 4 illustrates a two-bank exhaust system similar to that shown in FIG. 2, except that the pre-catalyst EGO sensor in one of the exhaust banks 36 is missing. Specifically, FIG. 4 illustrates that exhaust gases expelled from engine 32 pass through exhaust banks 34 and 36. In bank 34, the emissions level of the exhaust gases is sensed by pre-catalyst EGO sensor 38 before entering catalyst 40, and feedback signal EGO1a is provided to controller 202. After the exhaust gases exit catalyst 40, the emissions level is sensed by post-catalyst EGO sensor 42, and feedback signal EGO2a is provided to controller 202. With respect to exhaust bank 36, the exhaust gases expelled by engine 32 enter catalyst 44. After the exhaust gases exit catalyst 44, their oxygen content is sensed by post-catalyst EGO sensor 46, and feedback signal EGO2b is provided to controller 202. Then the exhaust gases are joined at junction 48 before being expelled from the system 30, though the disclosed invention is equally applicable to a system wherein the exhaust banks are kept separate throughout the entire system.

FIG. 5 is a flowchart illustrating the arc length ratio calculation process 50 according to the present invention. Because one of the banks 36 does not have a pre-catalyst EGO sensor, the process must also include the step of checking whether a pre-catalyst sensor is connected to the catalyst being monitored 56. If both pre-catalyst and post-catalyst EGO sensors are coupled to the catalyst (i.e. the catalyst is in a two-sensor bank), then the system continues calculating the arc length ratio in the known manner explained above 60, 62, 64, 66. If, however, the catalyst only has a post-catalyst EGO sensor coupled to it with no corresponding pre-catalyst EGO sensor (i.e. the catalyst is in a one-sensor bank, as shown in FIG. 4), the invention uses the arc length of the pre-catalyst sensor signal in the two-sensor bank of the engine for the arc ratio calculation in the one-sensor bank 58. In short, the invention assumes that the arc length of the missing pre-catalyst EGO sensor in the one-sensor bank would be the same as the arc length of the existing pre-catalyst EGO sensor in the two-sensor bank. This allows calculation of the arc ratios for both catalysts with only three measured arc lengths instead of the four arc lengths that are conventionally required in known methods. The arc length ratio calculations according to the present invention would therefore be as follows:

$$Arc\_ratio\_1 = Arc\_length12/Arc\_length11$$

$$Arc\_ratio\_2 = Arc\_length22/Arc\_length11$$

where:

Arc_ratio_1: arc ratio, two-sensor bank

Arc_ratio_2: arc ratio, one-sensor bank

Arc_length11: pre-catalyst sensor signal arc length, two sensor bank

Arc_length12: post-catalyst sensor signal arc length, two sensor bank

Arc_length22: post-catalyst sensor signal arc length, one sensor bank

Note that although the present invention was described in terms of a two-bank, three-EGO sensor system, as shown in FIG. 4, it is contemplated and should be understood that this invention can also be used in connection with a well-known two-bank four-EGO sensor system, as shown in FIG. 2, for purposes of compensating for a degraded pre-catalyst EGO sensor in one of the banks. In such a system, known methods, such as the method described in U.S. Pat. No. 5,899,062, can be used to monitor the catalysts in both banks while all four EGO sensors are operating properly. In the event that one of the pre-catalyst EGO sensors degrades, and if the degradation is detected by the system, the invention compensates for the degraded EGO sensors by conducting the arc ratio calculation using only three arc length measurements.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A system for monitoring catalyst operation in an engine, comprising:

a first exhaust gas sensor disposed upstream of a first catalyst, said first catalyst being coupled to a first cylinder group of said engine, said first exhaust gas sensor generating a first signal;

a second exhaust gas sensor disposed downstream of said second catalyst, said second catalyst being coupled to a second cylinder group of said engine, said second exhaust gas sensor generating a second signal; and, a controller coupled to said first and second exhaust gas sensors for calculating a first diagnostic signal corresponding to an efficiency of said second catalyst based on said first and second signals.

2. The system of claim 1 further including a third exhaust gas sensor disposed upstream of said second catalyst, said third exhaust gas sensor generating a third signal.

3. The system of claim 2 wherein said controller is further coupled to said third exhaust gas sensor and calculates said first diagnostic signal based on said first and second signals when said third exhaust gas sensor is degraded.

4. The system of claim 1 further including a third exhaust gas sensor disposed downstream of said first catalyst generating a third signal, said controller calculating a second diagnostic signal corresponding to an operating efficiency of said first catalyst based on said first and third signals.

5. The system of claim 4 wherein said first signal has a first arc length and said third signal has a second arc length, and said second diagnostic signal is a first arc length ratio of said first and second arc lengths.

6. The system of claim 5 wherein said first arc length ratio for said first catalyst is said second arc length divided by said first arc length.

7. A method for monitoring catalyst operation in an engine, comprising:

generating a first signal from a first exhaust gas sensor disposed upstream of a first catalyst coupled to a first cylinder group of said engine;

generating a second signal from a second exhaust gas sensor disposed downstream of a second catalyst coupled to a second cylinder group of said engine; and, calculating a first diagnostic signal corresponding to an efficiency of said second catalyst based on said first and second signals.

8. The method of claim 7 wherein said calculating step includes:

determining first and second signal incremental arc lengths of said first and second signals, respectively; and, calculating a first instantaneous arc length ratio for said second catalyst based on said first and second signal incremental arc lengths.

9. The method of claim 7 wherein said calculating step includes:

summing first signal incremental arc lengths of said first signal to obtain a first accumulated arc length;

summing second signal incremental arc lengths of said second signal to obtain a second accumulated arc length; and, calculating a first accumulated arc length ratio for said second catalyst from said first and second accumulated arc lengths.

10. The method of claim 7 further including:

generating a third signal from a third exhaust gas sensor disposed downstream of said first catalyst; and, calculating a second diagnostic signal corresponding to an operating efficiency of said first catalyst from said first and third signals.

11. An article of manufacture comprising:

a computer storage medium having a computer program encoded therein for monitoring catalyst operation in an engine, comprising:

code for receiving a first signal from a first exhaust gas sensor disposed upstream of a first catalyst coupled to a first cylinder group of said engine;

code for receiving a second signal from a second exhaust gas sensor disposed downstream of a second catalyst coupled to a second cylinder group of said engine; and, code for calculating a first diagnostic signal corresponding to an efficiency of said second catalyst based on said first and second signals.

12. A system for monitoring catalyst operation in an engine having a first catalyst and a second catalyst coupled to a first cylinder group and a second cylinder group, respectively, comprising:

a first exhaust gas sensor disposed upstream of said first catalyst, said first exhaust gas sensor generating a first signal;

a second exhaust gas sensor disposed downstream of said second catalyst, said second exhaust gas sensor generating a second signal; and, a controller coupled to said first and second exhaust gas sensors for calculating a first diagnostic signal corresponding to an operating efficiency of said second catalyst based on said first and second signals, wherein no oxygen sensor is disposed upstream of said second catalyst.

13. A system for monitoring catalyst operation in an engine having a first catalyst and a second catalyst coupled to a first cylinder group and a second cylinder group, respectively, comprising:

a first exhaust gas sensor disposed upstream of said first catalyst, said first exhaust gas sensor generating a first signal;

a second exhaust gas sensor disposed downstream of said second catalyst, said second exhaust gas sensor generating a second signal; and, a controller coupled to said first and second exhaust gas sensors for calculating a first diagnostic signal corresponding to an operating efficiency of said second catalyst based on said first and second signals, wherein no sensor is disposed upstream of said second catalyst for air/fuel control of said engine.

14. A system for monitoring catalyst operation in an engine having a first catalyst and a second catalyst coupled to a first cylinder group and a second cylinder group, respectively, comprising:

a first exhaust gas sensor disposed upstream of said first catalyst, said first exhaust gas sensor generating a first signal having a first arc length;

a second exhaust gas sensor disposed downstream of said second catalyst, said second exhaust gas sensor generating a second signal having a second arc length; and, a controller coupled to said first and second exhaust gas sensors for calculating a first diagnostic signal corresponding to an operating efficiency of said second catalyst based on said first and second arc lengths.

15. A method for monitoring catalyst operation in an engine having a first catalyst and a second catalyst coupled to a first cylinder group and a second cylinder group, respectively comprising:

generating a first signal from a first exhaust gas sensor disposed upstream of said first catalyst;

generating a second signal from a second exhaust gas sensor disposed downstream of said second catalyst;

indicating when a third exhaust gas sensor disposed upstream of said second catalyst is degraded; and, calculating a first diagnostic signal corresponding to an operating efficiency of said second catalyst based on said first and second signals when said third exhaust gas sensor is degraded.

16. A method for monitoring catalyst operation in an engine having a first catalyst and a second catalyst coupled to a first cylinder group and a second cylinder group, respectively comprising:

generating a first signal from a first exhaust gas sensor disposed upstream of said first catalyst, said first signal having a first arc length;

generating a second signal from a second exhaust gas sensor disposed downstream of said second catalyst, said second signal having a second arc length; and, calculating a first diagnostic signal corresponding to an operating efficiency of said second catalyst based on said first and second arc lengths.

17. An article of manufacture comprising:

a computer storage medium having a computer program encoded therein for monitoring catalyst operation in an engine having a first catalyst and a second catalyst, comprising:

code for receiving a first signal from a first exhaust gas sensor disposed upstream of said first catalyst, said first signal having a first arc length;

code for receiving a second signal from a second exhaust gas sensor disposed downstream of said second catalyst, said second signal having a second arc length; and, code for calculating a first diagnostic signal corresponding to an operating efficiency of said second catalyst based on said first and second arc lengths.

* * * * *